United States Patent [19]
Martinez

[11] 4,193,278
[45] Mar. 18, 1980

[54] LOCKED KEY RING

[76] Inventor: Jorge M. Martinez, 2857 Burt St., Las Vegas, Nev. 89101

[21] Appl. No.: 903,940

[22] Filed: May 8, 1978

[51] Int. Cl.² ............................................. A44B 15/00
[52] U.S. Cl. ........................................ 70/459; 24/235
[58] Field of Search ............... 70/459, 22; 24/241 R, 24/241 S, 241 SP, 241 PL, 233, 234, 235

[56] References Cited
U.S. PATENT DOCUMENTS

| | | | |
|---|---|---|---|
| 617,081 | 1/1899 | Conger | 24/235 |
| 3,956,804 | 5/1976 | Gatof et al. | 24/235 |

FOREIGN PATENT DOCUMENTS

439516  9/1948  Italy ............................................ 70/459

*Primary Examiner*—Kenneth Dorner

[57] ABSTRACT

A key ring that gives maximum security against keys accidentally disconnecting therefrom and getting lost; the key ring including a hook-shaped key-holding ring, the hook, accordingly, being adjacent an opening in the ring, so as to allow the keys to be hooked on the hook, a circular wheel positioned each side of the hook being each rotatable on a common pin, each wheel having a peripheral notch that must align with the key ring opening so that keys can be put on or removed from the ring, and when the notches are dis-aligned with the ring opening, the keys cannot accidentally be disengaged from the ring and lost.

1 Claim, 5 Drawing Figures

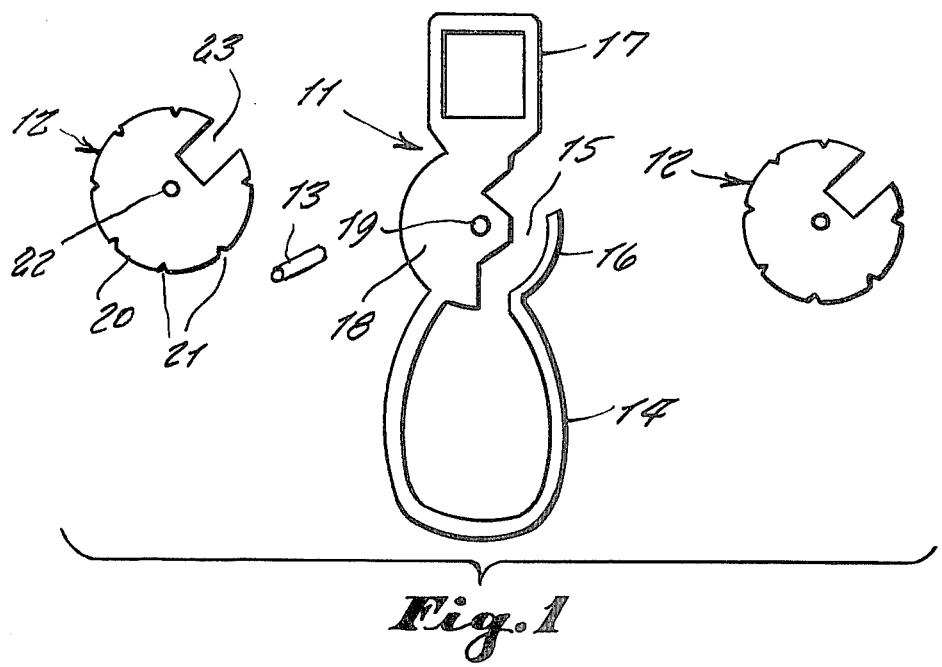
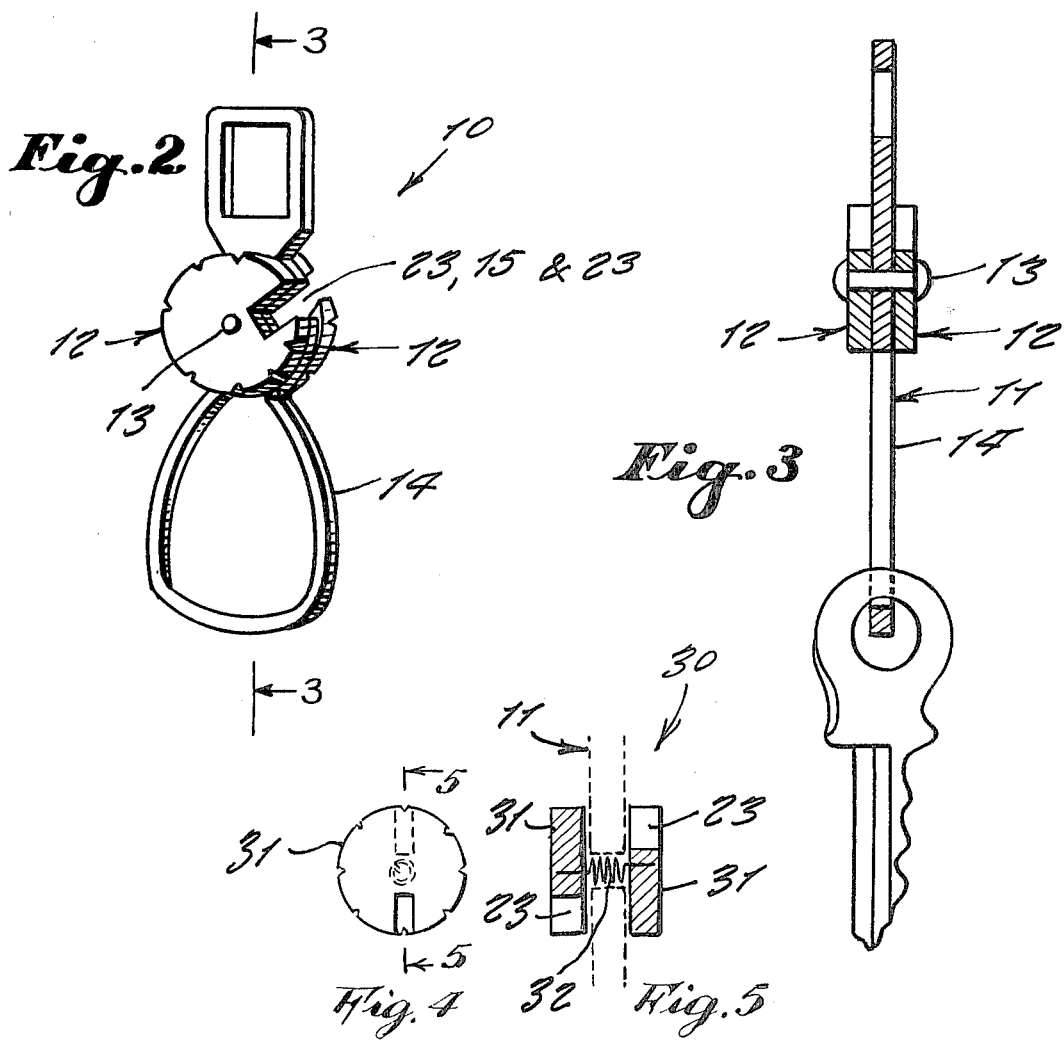

LOCKED KEY RING

This invention relates generally to key rings.

A principal object of the present invention is to provide a key ring that is more secure against keys accidentally working themselves off the ring; and thus getting lost.

Another object is to provide a key ring that includes rotatable parts that must all align with a ring opening in order for a key to be removed from the ring, so that the chances of all accidentally becoming aligned at a same time is not likely; the rotating parts thus forming a lock for the key ring.

Another object is to provide a locked key ring which can be quickly and readily opened when so wished, and which is made from minimum parts and which is not bulky in a pocket or a purse.

Other objects are to provide a locked key ring which is simple in design, inexpensive to manufacture, rugged in construction, easy to use and efficient in operation.

These and other objects will be readily evident, upon a study of the following specification, and the accompanying drawing wherein:

FIG. 1 is a side view of the invention components, shown separated;

FIG. 2 is a perspective view thereof, shown assembled;

FIG. 3 is a cross-section on line 3—3 of FIG. 2;

FIGS. 4 and 5 show another design of the invention wherein the pivot pin is substituted by a fairly stiff coil spring affixed at each end to the toothed wheels; the wheel notches being disaligned with each other normally, so that there is no accidental possibility of ever aligning all together with the ring notch and loose keys; but which can be forcibly aligned all together, so as to insert or remove keys by rotating one of the wheels against the spring action, while the other wheel is held stationary.

Referring now to the drawing in greater detail, and more particularly to FIGS. 1 to 3 thereof at this time, the reference numeral 10 represents a locked key ring, according to the present invention, wherein the same is composed of only four parts, which are a ring member 11, two wheels 12 and a pivot pin 13, all of which are of a strong material, preferably of a hard metal.

The ring member 11 includes a generally open circular or oval ring element 14 having an opening 15 adjacent a hook end 16. The ring element 14 is at one end of the ring member 11. A closed loop 17 is formed at an opposite end of the ring member, so as to be attachable to a key chain, not shown, if so preferred, or for hanging on a wall hook. A central, circular flat portion 18, between the element 14 and loop 17, has a central opening 19 therethrough for receiving the pivot pin 13. As clearly shown in FIG. 1, the hook end 16 and the opening 15 form parts of the circular outline of the central portion 18.

Each wheel 12 is flat, and has a circular edge 20, provided with a series of shallow cross grooves 21, so as to give a better functional grip when turned by a person's finger. Each wheel has a central opening 22 through which the pivot pin 13 extends. An elongated notch 23 is on a periphery of each wheel, so as to align with the opening 15 of the ring member. Each wheel is independently rotatable.

In operative use, it is now evident, that when the notch 23 of both wheels, and the opening 15 of the ring member are aligned, as shown in FIG. 2, a key can be inserted into the aligned notches and opening 15, so that thereafter the both wheels can be rotated on the pivot pin, so that gradually the hook becomes exposed between the notches, and the key is slided on the hook as the notches are advanced, so that eventually the key can then be slided on the ring element 14, thus securely locking the key thereupon.

In FIG. 4 and 5, a modified design of the invention comprises a locked key ring 30, that includes the above described ring member 11, and a pair of flat wheels 31 and a coil spring 32 instead.

The spring fits rotatably in the opening 19, and opposite ends of the spring are each anchored rigidly in one of the wheels located adjacent each side of ring member 11. It is to be noted that when the spring is relaxed, that the notches 23 of both wheels are disaligned with each other, as shown in the Figures.

When a key is to be added or removed from the key ring 30, the wheels are rotated respective to each other, thus winding or unwinding the spring therebetween, so to align the notches 23 with each other, and which are then aligned with the opening 18 of the ring member 11.

Thus, in this form of the invention, the notches cannot accidentally become aligned with each other, except when so wished. In this form of the invention, the spring serves as a pivot pin.

While various changes may be made in detail construction, it is understood that such changes will be within the spirit and scope of the present invention, as is defined by the appended claims.

What I claim is:

1. A locked key ring, comprising, in combination, a flat ring member, a round flat wheel positioned on each opposite side of said ring member; said ring member including an open ring element at one end, a closed loop at an opposite end and a circular portion therebetween having the same diameter as said wheels, said circular portion including a hook on an end of said ring element, and an opening adjacent said hook, each said wheel having a peripheral notch for selective alignment with said opening, said flat ring member including an opening through a center of said circular portion, a tension coil spring directly journalled rotatably free in said circular portion central opening, each opposite end of said spring being rigidly anchored within one of said wheels, said wheel notches being misaligned with each other when said spring is rotationally relaxed, and said spring allowing rotation of said wheels respective to each other and said ring member.

* * * * *